(No Model.) 2 Sheets—Sheet 1.
J. E. WATSON.
GALVANIC BATTERY.
No. 415,593. Patented Nov. 19, 1889.
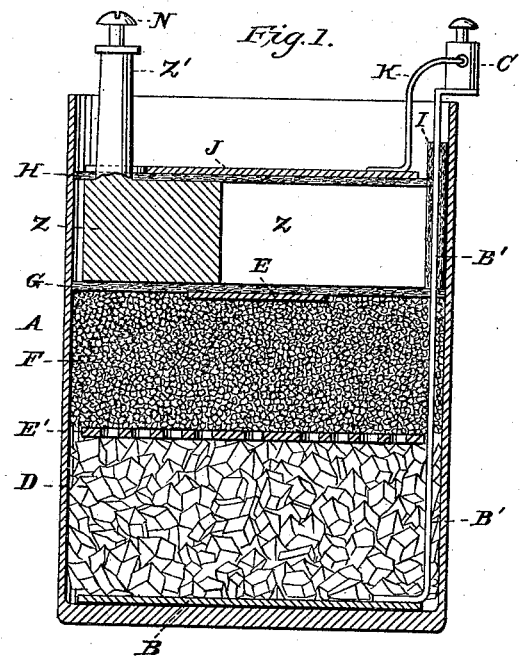
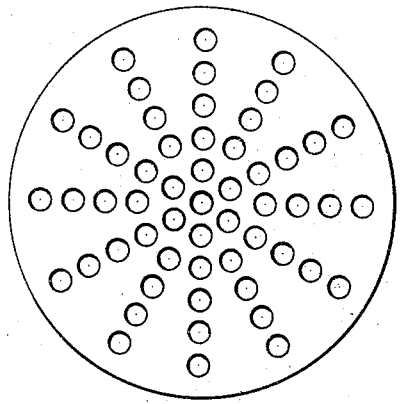
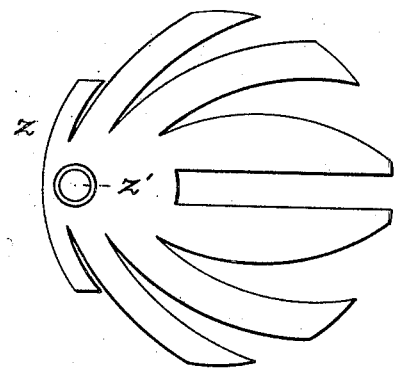
WITNESSES
Villette Anderson
Grace M. Craig
INVENTOR
John E. Watson,
by Anderson Smith
his ATTORNEYS (No Model.)  2 Sheets—Sheet 2.
J. E. WATSON.
GALVANIC BATTERY.
No. 415,593. Patented Nov. 19, 1889.
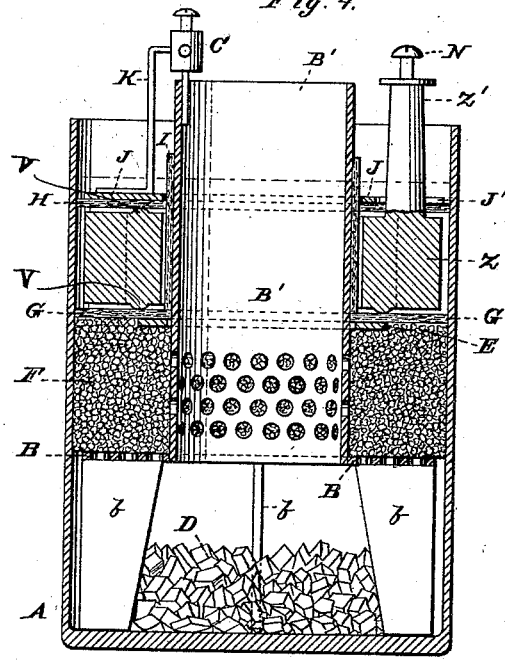
Fig. 4.
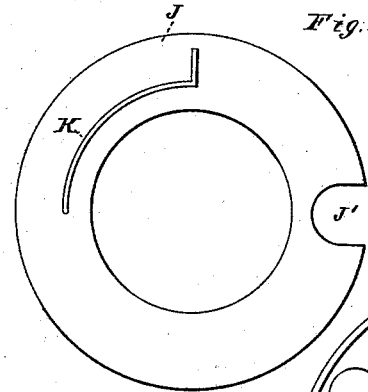
Fig. 5.
Fig. 8.
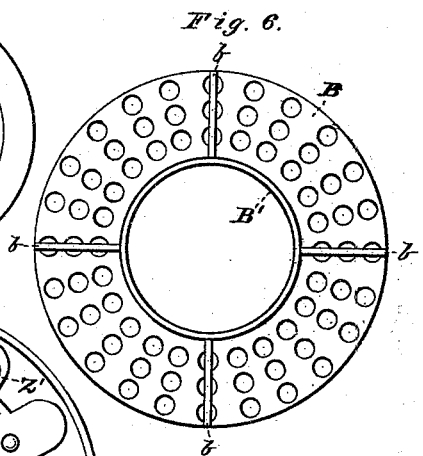
Fig. 6.
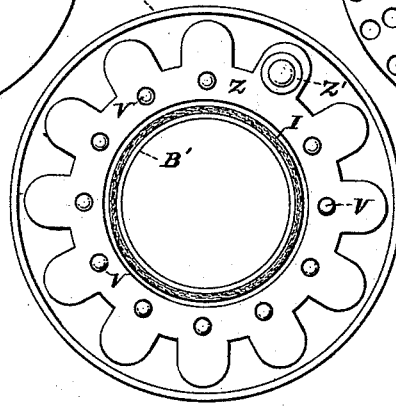
Fig. 7.
WITNESSES
Villette Anderson,
Grace M. Craig
INVENTOR
John E. Watson,
by Anderson & Smith
his ATTORNEYS

UNITED STATES PATENT OFFICE.

JOHN EDWARD WATSON, OF LOUISVILLE, KENTUCKY.

GALVANIC BATTERY.

SPECIFICATION forming part of Letters Patent No. 415,593, dated November 19, 1889.

Application filed June 23, 1885. Serial No. 169,551. (No model.)

*To all whom it may concern:*

Be it known that I, JOHN EDWARD WATSON, a citizen of the United States, residing at Louisville, in the county of Jefferson and State of Kentucky, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of this invention, and is a vertical section. Figs. 2 and 3 are detail views of portions shown in Fig. 1. Fig. 4 is a modification of the invention, and is a vertical section. Figs. 5, 6, 7, and 8 are detail views of parts of Fig. 2.

This invention has relation to galvanic or voltaic cells, more particularly to such as are constructed to use sulphate of copper or blue vitriol; and the object is to reduce the internal resistance of the cell or battery, remedy the evil or counteracting effects of polarization, and also to prevent what is termed "local action," or that action by which, when the circuit of the battery is open or not in use, the zinc is consumed when such consumption does not contribute to the current.

The invention also consists in the adaptability of the improvements to the present existing forms of sulphate-of-copper batteries by which they may be enabled to furnish much stronger currents, such improvements being easily and cheaply added, all as will be better understood by reference to the accompanying drawings, forming a part of this specification.

In the accompanying drawings, the letter A designates the battery-jar, which is preferably made of glass.

B is a copper or lead disk provided with a strip or tube B', extending above the liquid in the cell and carrying the binding-post C, or positive pole or terminal of the battery.

D indicates that portion of the jar which is occupied by the crystals of copper sulphate or blue vitriol.

E represents a small disk or plate of copper or lead, which is designed to start the copper deposit on the prepared coke or carbon, (indicated at F.)

E' indicates a horizontal copper paitition plate or disk, which is perforated, and is arranged in the cell to support the prepared coke or carbon and prevent it from descending into or mixing with the crystals of the copper sulphate.

G designates one or more layers of porous or fibrous material which are non-conductors of electricity. This fibrous non-conductor is arranged above the plate or disk E and under the zinc Z, or in position to separate the zinc from the disk E and from the carbon F.

H represents one or more layers of porous or fibrous non-conducting material arranged in position to separate the zinc from the depolarizing-plate J.

I represents the porous or fibrous insulator of the strip or tube B', preventing accidental contact between said strip or tube and the zinc.

J indicates a depolarizing-plate, which may be of carbon, copper, lead, or any metal not acted on by the oxidizing-fluid of the battery. As this plate must not touch any part of the zinc, it should be cut away or have a good clearance where the zinc post Z' passes upward to receive the binding post or clamp N or negative pole of the cell.

K indicates a wire or connection between the depolarizing-plate and the negative element of the cell. In the construction shown it is represented as extending from the plate J to the positive pole or terminal C.

The metallic zinc Z may be of any shape designed to expose a large surface to the fluid in the cell. It is provided with the post Z', having some suitable form of clamp for the wire of the circuit. This forms the return or negative pole of the cell. Small bosses V may be provided on the zinc on its upper and under surfaces to allow the fluid of the cell to circulate freely.

Referring more particularly to the features of the invention, it is stated that the disk or plate on which the prepared coke or carbon F rests should be provided with many small perforations, in order that the solution of copper sulphate may circulate freely through the lower portion of the coke or carbon, the upward circulation or diffusion being regulated by the coke or carbon itself, this porous material acting automatically to keep the lighter and heavier particles in their proper places and assisting in the prevention of local action in the cell. This disk or plate should be in immediate contact with the crystals of copper sulphate, and is designed to assist in starting the operation of coating the coke or carbon with metallic copper.

The porous substance or semi-conductor F has been described as consisting of particles of coke or carbon suitably prepared. It is preferably made of coke or carbon subdivided into small pieces, and before using it in the battery it should be treated as follows: The crushed particles are cleaned and thoroughly dried to expel moisture. Then while hot or warm it should be bathed in a solution of acetate of lead. The solution I usually employ is of the strength of one-half ounce of the acetate of lead to one gallon of soft or rain water. In this bath the broken carbon or coke is well stirred about in order that the solution may reach all the pores of the material. Then the coke or carbon is well drained of the solution and allowed to dry out slowly or by a gentle heat in such a manner that a small amount of the acetate of lead may remain in the coke or carbon. It is then ready for use in the cell or battery. By this preparation the coke or carbon is rendered capable of increasing the conductivity of the fluid portion of the cell and is itself better adapted to receive the metallic copper coating thrown down from the solution. In this or similar manner it is designed to provide a continuation or extension of the negative or copper element or metal of the cell, presenting a very large surface and extending it into the white or zinc sulphate solution in close proximity to the zinc or positive element of the cell or battery. The metallic zinc Z is insulated from the carbon or coke by any suitable porous layer or diaphragm or envelope which is a non-conducting substance, the fluid, however, acting in its pores and meshes as a conductor. The quantity of current is greatly increased by the use of large surfaces of the opposite metals, especially when such opposite metals are brought closely together, but insulated from each other with regard to actual or metallic contact.

It is designed by the use of the prepared coke, carbon, or porous substance F to materially lessen the internal resistance of the cell or battery itself, to greatly increase the surface of negative with proportionate increase of positive metal, to prevent too great rising or diffusion of the blue fluid, and thereby to obviate to a material extent local action in the cell or battery, to prevent deposition of metallic zinc on the negative element or parts thereof, and to prevent deposition of metallic copper on the metallic zinc. The layers or diaphragms G may be of any suitable open porous or fibrous material—such as cotton, wool, or felt—or in some cases porous earthenware. This material should, however, be a non-conductor to electrical currents, the currents, however, passing freely by the fluid in the pores or meshes of the material between the zinc and the prepared coke or carbon. These layers, diaphragms, or partitions also serve to prevent the coating of the zinc with metallic copper should the blue-vitriol solution rise to the height of the zinc while the battery is in open circuit or not at work. They also serve to prevent particles of oxide of zinc or other impurities from falling on or becoming attached to the copper-coated coke or carbon F, and are instrumental in preventing local action when the circuit is left open. The layer, diaphragm, or partition H also is made of porous or fibrous non-conducting material. Its office is to prevent metallic contact between the zinc Z and the depolarizing-plate J, which is a continuation or extension of the negative metal. This depolarizing-plate J is usually of copper or lead and is supplied with a wire-connection of sufficient length to be attached to the positive terminal. This plate should never come in contact with any part of the zinc. This plate is designed to more fully correct counteracting currents or materially to prevent the generation of currents in opposite directions by polarization. To this end the plate J is placed above and near to the zinc, but insulated from metallic contact therewith by means of a porous or fibrous diaphragm or partition. Hydrogen formed at the plate J, combining with surplus oxygen, will form water and prevent too great density of the fluid. Such polarizing effect as may be set up will be removed to a point or locality where it is less liable to effect the strength of the main or prime current. In the construction illustrated the zinc or positive element is represented as encompassed by, but insulated from, metallic contact with the negative metal; but in some forms of cells I may find it advisable to reverse the arrangement, encompassing the negative metal by the positive and insulating upon the same principle, however.

I have in this description designed to show how my improvements can be introduced into cells of ordinary character. The cells shown are of simple form, and with the exception of the improvements which I have introduced are similar to existing forms of cells in which copper sulphate is used. The main features which I have introduced are the prepared coke, carbon, or porous semi-conductor, the depolarizing-plate, and the porous diaphragms or partitions. The introduction of these devices and their proper arrangement involve but little expense. It may be advisable to provide the cells with some form of cover to prevent too rapid evaporation, particularly when the batteries are for long periods left in open circuits. Owing to the very low internal resistance of this cell or battery it will be found desirable to connect a considerable number in series, as this can be done without greatly increasing the resistance of the series. For such cells or batteries a modification may be employed, involving the use of a perforated feeding tube or passage, whereby the blue-vitriol crystals can be at any time added. Powerful currents can in this way be maintained for electric lighting, operating electromotors, and other purposes. Such a modification is illustrated in Fig. 4 of the drawings, in which A represents the jar or cell, and B the copper or lead disk, properly fitted to a metallic tube B'. The disk should be of such shape and size that it will neatly fit the jar, and the tubular portion should have a diameter usually not greater than one-third the diameter of the disk B. The tube B' should be provided with numerous perforations from the upper side of the disk B, which should also be provided with perforations. These perforations are preferably made from three-sixteenths to three-eighths of an inch in diameter, and are designed to allow a free circulation of the sulphate-of-copper solution to pass through the coke or carbon surrounding the tube B' and resting on the disk. The connected tube and disk may be supported by studs or legs or in any other convenient manner to form a receptacle therebelow with which the tube communicates. This chamber receives the crystals of sulphate of copper, and through the tube B' fresh crystals can be at any time added, as may be indicated by the paleness of the fluid. The tube B' should be of sufficient height to project above the rim of the jar, and is provided with a suitable form of binding screw or clamp which receives the wire of the circuit and is the positive terminal or pole of the cell. Usually I prefer that the chamber below the disk B occupied by the sulphate of copper shall be from two and a half to three inches in depth.

E designates a copper or lead disk of smaller diameter than the disk B and of annular form, being designed to loosely pass over the tube B'. This annular plate need not be perforated. This annulus rests on the prepared carbon or coke, and is designed to serve to start the deposition of metallic copper. The carbon or coke is placed on the disk B and encompasses the tube B' to a height sufficient to cover the perforations in said tube. These perforations permit a free circulation through the prepared coke or carbon to the copper-sulphate solution at the bottom and the zinc-sulphate solution in the upper portion. The use of this semi-conductor and the perforations thereof have been hereinbefore described.

G represents the layer or layers of porous or fibrous material, which is a non-conductor of electricity—such, for instance, as well-baked or unglazed earth. The thinner the layer the closer the zinc z is allowed to approach the carbon or continuation of the negative, and there will consequently be a proportionate reduction of the internal resistance of the cell. Therefore by modifying the diaphragm the internal resistance of that cell can be varied to suit different kinds of work, such as require different currents—that is to say, currents of high tension or of low tension. In this form of cell the zinc should be made in annular or cylinder form, but having projections, so that it will present a large surface to the exciting-fluid. Its opening is made somewhat larger than the tube B', because it must in no way touch or be liable to come in contact with said tube. In some cases it may be advisable to surround the tube B' at this point with a layer of non-conducting material—such, for instance, as that which composes the diaphragms G and H. The zinc should be provided with a post or stud extending upward and having some suitable form of binding-screw or connection for the return-wire of the circuit, the negative pole, or terminal of the cell.

J designates the depolarizing-plate, which is made of metal similar to that composing the disk B; but as there is no corrosion on this plate it may be made much lighter, as also may the disk E. As in other cells, the deposit takes place first at a point nearest the zinc. In order that a large surface may be brought into action, the cell or battery is constructed so as to bring all or nearly all parts of the zinc cylinder equally near to the negative element, or to an extended part or continuation of the same, through the coke or carbon on the lower side, the depolarizing-plate J on the upper side, and the tube B on the inner side. To facilitate the action, I have adapted the plate E to serve in starting the deposit on the carbon, coke, or semi-conductor F.

I do not desire to limit myself to the exact construction described, as the devices employed may be varied in many well-known ways without departing from the spirit of the invention.

The operation of the cell is such that nearly all of the copper for the decomposition of the sulphate of copper is deposited on the outside of and through the pores of the semi-conductor, while such semi-conductor is at the same time protected from contamination by oxide of zinc or impurities contained in the metallic zinc or in any chemical manner evolved during the action of the cell from the zinc. Therefore the copper-coated coke or carbon becomes a desirable means for making sulphate of copper by proper processes.

Having described this invention, what I claim, and desire to secure by Letters Patent, is—

1. In a galvanic or voltaic cell, the depolarizing-plate J, standing above and insulated from the zinc or positive metal and in metallic connection with the copper or negative metal, which is below, and insulated from the positive metal, substantially as specified.

2. In a galvanic or voltaic battery, the combination of the depolarizing-plate J, the zinc or positive metal between and insulated from said plate, the porous semi-conductor below and insulated from the positive metal, and the negative metal below said semi-conductor and in metallic connection with the depolarizing-plate, substantially as specified.

3. In a galvanic or voltaic battery, the combination, with the porous semi-conductor, of the plate E, of copper, connecting metallically the separate lumps nearest the positive element or metal of said semi-conductor, the perforated supporting-plate E', and the depolarizing-plate J, substantially as specified.

4. In a galvanic or voltaic battery, the combination of the depolarizing-plate J, the positive metal or element below and insulated from said plate, and the negative metal or element below and insulated from the positive metal or element and in metallic connection with the depolarizing-plate, substantially as specified.

5. In a galvanic or voltaic battery, the combination, with the positive and negative elements, of the porous semi-conductor, the insulating devices thereof, the plate E, of copper and metallically connecting the central lumps in the upper layer of said semi-conductor, and the depolarizing-plate J, substantially as specified.

6. In a galvanic or voltaic cell, the combination, with the positive and negative elements, of the porous semi-conductor between the positive and negative elements, the depolarizing-plate separated from said semi-conductor by the positive element, and the porous diaphragms separating said elements and plate and insulating one from the other, substantially as specified.

7. In a galvanic or voltaic cell, the combination, with the positive and negative elements, of the perforated tube B' and disk B, the porous semi-conductor, and the depolarizing-plate J, substantially as specified.

8. In a gravity-battery, a perforated plate and an upwardly-extending perforated tube or strip provided with a binding-post and secured to said plate, in combination with a porous or finely-divided semi-conductor treated with lead salt and situated between the positive and negative elements, and a depolarizing-plate J above the zinc, but disconnected and insulated therefrom by a porous diaphragm and metallically connected to and continuing the negative element, substantially as specified.

9. In a galvanic or voltaic cell, the copper disk B, having the tube or strip B', provided with a binding-post, the porous semi-conductor treated with lead salt and situated between the positive and negative elements, the insulated metallic zinc above the porous prepared semi-conductor having a post or extension provided with a binding-post, and a depolarizing-plate J, disconnected from the metallic zinc, but in electric connection with and continuing the copper or negative element, substantially as specified.

10. In a galvanic or voltaic battery, the combination, with the positive and negative elements, of the depolarizing-plate J, connected to and forming a continuation of the negative element above the zinc, and the porous lead-treated semi-conductor below the zinc and forming an upward extension of the negative element below the zinc, substantially as specified.

11. In a galvanic or voltaic cell, the combination, with the insulated zinc, of the extension of the negative element upward in close proximity to said zinc, and the porous diaphragm below the zinc and insulating the same from said extended negative element, substantially as specified.

In testimony whereof I affix my signature in presence of two witnesses.

JOHN EDWARD WATSON.

Witnesses:
GEO. S. ALLISON, Jr.,
H. C. TAFEL.